June 30, 1936. M. A. S. LAVIGNE 2,045,862
APPARATUS FOR HANDLING FLUIDS AND GASES
Filed June 17, 1933 2 Sheets-Sheet 1
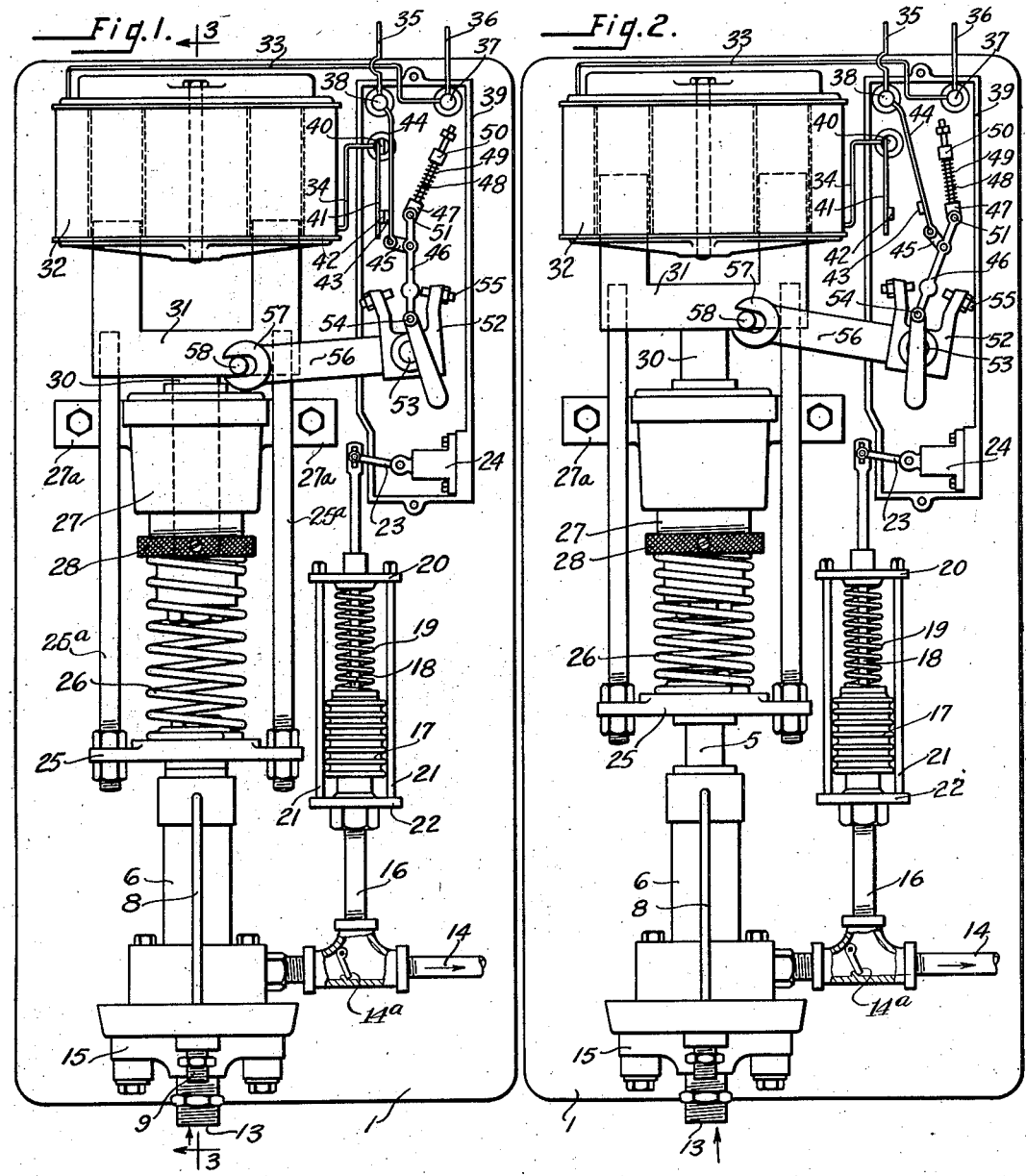
INVENTOR
MICHAEL A. S. LAVIGNE.
BY
ATTORNEYS June 30, 1936. M. A. S. LAVIGNE 2,045,862
APPARATUS FOR HANDLING FLUIDS AND GASES
Filed June 17, 1933 2 Sheets-Sheet 2
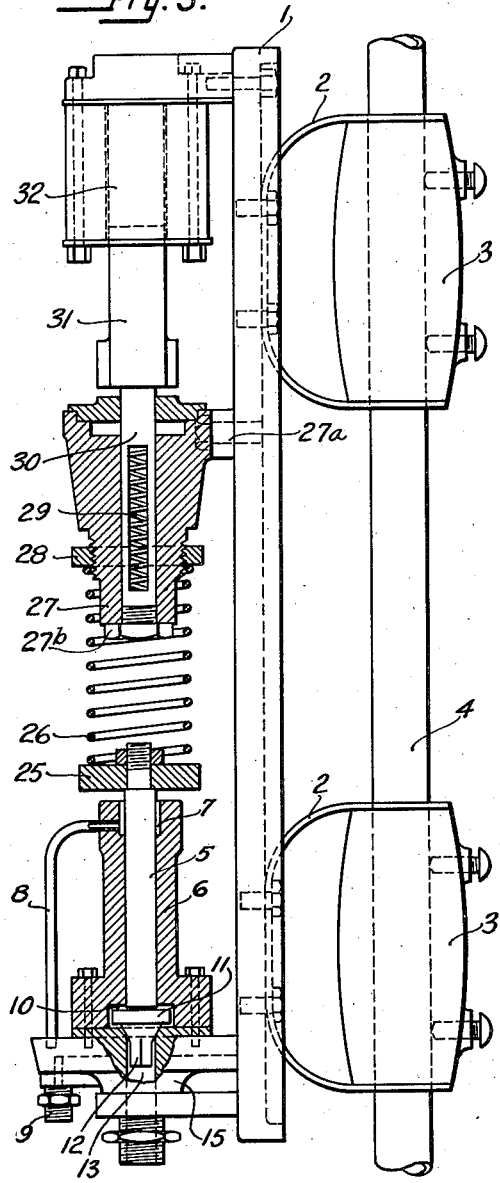
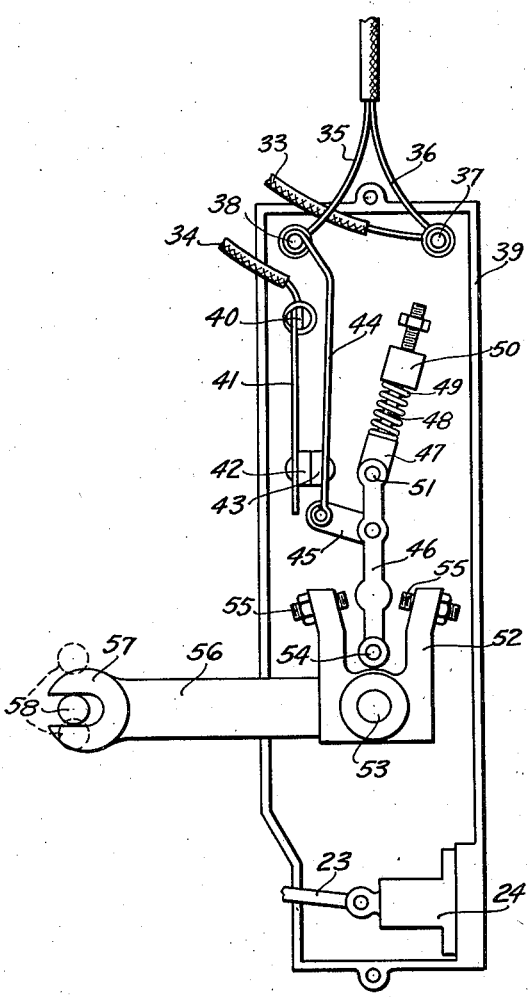
INVENTOR
MICHAEL A. S. LAVIGNE.
BY
ATTORNEYS Patented June 30, 1936

2,045,862

UNITED STATES PATENT OFFICE 2,045,862

APPARATUS FOR HANDLING FLUIDS AND GASES

Michael A. S. Lavigne, Worcester, Mass.

Application June 17, 1933, Serial No. 676,345

10 Claims. (Cl. 103—53)

My invention relates to a method and mechanism for the handling of gases and liquids.

It is particularly my object to provide an electrically-operated, reciprocating mechanism to be used in conjunction with any mechanical device where a reciprocal element is the primary factor in supplying movement to gases or liquids being handled by the mechanism.

It is my object to provide a reciprocating element moved in one direction by a solenoid and in the other direction by a spring, such movements being controlled so that the action of the solenoid is intermittent.

It is a further object to provide a control so that the pressure on the gases or fluids will control the time of applying the reciprocating member to produce further pressure.

In particular, it is my object to provide an intermittently-operating gas or fluid moving mechanism which is actuated in one direction by a solenoid and in the other direction is yieldingly and adjustably actuated by a spring so that the pressure will be maintained constant on the fluid or gas as such fluid or gas is utilized, and upon the exhaustion of the effect of the spring, if the pressure had been so reduced as to necessitate an additional supply of gas or liquid under pressure, the solenoid will again operate to impart a new stroke to the pump mechanism.

It is my object to provide a pump having a reciprocating member of relatively small size operable in one direction by a solenoid which is then disconnected from the source of current supply and is then operated in the other direction by a mechanical means, such as a spring, that yieldingly adjusts the return movement according to the rate of flow of the gas or liquid which is being thus impelled.

One of the primary features of my invention is the fact that the mechanism is very simple and easy to operate, there are no rotary parts that must be lubricated, there are no close-fitting parts, the rusting of which will cause difficulty in pump installations, and particularly the mechanism only operates when it is necessary to bring up the pressure to the required point so that an appreciable part of the entire time during which the mechanism is in effect it is idle and no current is being consumed.

It is my object to provide a mechanism which has a simple, self-cleaning valve which need not be accurately built or machined.

In particular, it is my object to provide a mechanism that will produce high pressures while the mechanism itself will be of simple construction.

My invention is particularly adaptable to the pumping of such liquids as fuel oil for furnaces, water, refrigerants, and the like.

Due to the fact that there is only a reciprocating plunger and a check valve associated with the pump, the cost of machining of the parts is minor and they are so arranged that leakages are diverted back into the main line so that it is unnecessary to have closely fitting parts.

The unit is portable and is operable on any type of electric current, whether from central stations or from batteries, and may be operated with any type of switch.

Referring to the drawings:

Figure 1 is a front elevation of the mechanism showing the parts starting upwardly;

Figure 2 is a similar view showing the parts starting downwardly;

Figure 3 is a section on the line 3—3 of Figure 1;

Figure 4 is a detail view of the toggle switch.

Referring to the drawings in detail, 1 is a supporting base or bracket which is mounted upon the spring supports 2 that are in turn mounted on rubber cocks 3 on a supporting rod 4. The exact form of support is immaterial.

Pump

The pump comprises a pump plunger 5 constituting a piston within the cylinder 6. Any leakage around this piston of fluid will find its way into the chamber 7, thence back through the pipe 8 and line 9 into the source of supply of the liquid.

The lower end of the plunger or piston 5 extends into the chamber 10 formed into the cylinder 6. In this chamber 10 fits a check valve having the head 11 and a tapered shank 12, which extends into the inlet passageway 13 from the source of supply of liquid. When the piston 5 descends, this valve seats and the liquid that has been drawn in beneath the valve is expelled through the discharge line 14. It will be noted that the inlet line 13 terminates in a casting 15 which acts as the valve seat for the valve 11. In the discharge line between the chamber 10 and a pipe 16 is a check valve 14a.

The outgoing line 14 has a pipe 16, on the end of which is mounted a metallic bellows 17 carrying a stem 18 surrounded by a spring 19 that has one end resting on the bellows and the other end on the inside of the cross head 20 which is carried on the uprights 21 on a lower cross head 22 mounted on the pipe 16.

This stem 18 is connected by a link 23 to a line switch 24 so that, when the pressure becomes sufficient in the line 14, the stem 18 will rise and cut off the supply of electric current for actuating the piston 5.

*Pump actuating mechanism*

Returning to the piston 5, it will be noted that on the upper end of the piston 5 is mounted a collar 25 on which rests the spring 26, the upper end of which surrounds a collar 27 that abuts against a washer 28 threaded on the collar 27. The collar or abutment 27 is mounted on the support 1 at 27a and is stationary. This collar 27 has mounted therein yieldingly on a cushioning spring 29 a plunger 30 which is connected to the bottom of a U-shaped magnet 31 constituting the armature of a pair of solenoid coils 32. The spring 29 engages at one end the plunger 30 and at its other end the plug 27b, threaded into the lower end of the collar 27. These coils are connected by the lines 33 and 34 through a switch to be hereinafter described to supply lines 35 and 36 which are connected to the terminals 37 and 38 of the switch box 39. The line 34 is connected to a terminal 40 which has a stationary support for a contact finger 41 having a contact face 42. A movable contact face 43 engages therewith. It is carried upon a spring finger 44 mounted on the terminal 38. This movable arm 44 is pivotally connected to a link 45 at the bottom and is likewise pivotally mounted on the terminal 38. The link 45 is in turn connected to a lever 46, the upper end of which is pivotally connected to a plug 47 carrying a pin 48 surrounded by a spring 49, the upper end of which engages against a pivot block 50 through which the pin 48 passes. Thus, when the toggle link comprising the members 46, 47, and 48 is actuated over dead center by reason of the pivotal action at 51 the contact faces 42 and 43 are opened or closed, as the case may be.

This movement over dead center is effected by the yoke 52 pivoted at 53 adjacent the pivotal support 54 of the lever 46.

The contact pins 55 on the yoke alternately engage the lever 46 and shift it from one position to the other. The yoke itself is moved by the arm 56 which has a yoke 57 at its free end engaging with a pin 58 carried on the magnet 31.

*Operation*

Assuming the current to be on and being supplied through the power lines 35 and 36, the switch 24 being closed as there is reduced pressure in the line 14 permitting this closure of the switch, if the parts are in the position as shown in Figure 1, the solenoid 32 will be energized lifting upwardly the collar 25 on either side of which are connected the rods 25a, the upper ends of which are connected into the core 31 of the solenoid.

As this structure moves upwardly it compresses the spring 26 until the core gets to its uppermost position, as in Figure 2, whereupon the pin 58 operating through the yoke 57 and arm 56 moves the yoke 52 and shifts the lever 56 over dead center to open the contacts 42 and 43. The stored-up energy in the spring 26 then moves the structure downwardly against the supply of fluid which has been drawn in over the valve 11 and trapped within the cylinder 6.

It will be noted that the spring ejects the fluid or gas through the line 14 in proportion to the consumption of such gas or fluid. The spring 26 can only expand in proportion to this consumption.

During the period of the ejection of the fluid or during the period that the pressure is sufficiently high in 14 to keep the switch 24 open, no electrical current will be consumed at all. The pump is, therefore, an intermittently operating device which only consumes current in proportion to the fluid or gas being consumed.

Due to the construction, very high pressures are secured and liquids of any character or gas of any character may be handled because there is a minimum of opportunity for the clogging or sticking of valves and the one valve that is used is a self-cleaning valve so that it readily seats irrespective of the nature of the liquid or gas being handled.

It will be understood that I desire to comprehend within my invention such modifications as may be necessary to adapt it to varying conditions and uses.

It will be understood that where I refer to liquid I also include gases.

Having thus fully described my invention, what I claim as new and desire to secure by Letters Patent, is:

1. In combination, a pump, a solenoid, a pair of rods connecting the solenoid core and the pump piston, yielding means between the rods to resist the movement of the core and the piston, and to return the core and piston to initial position when the solenoid is inoperative, switch means, snap means to open and close the switch adapted to be operated by the movement of the core, a lever operated by the core for operating the snap means, and means controlled by the pressure of the liquid pumped adapted to control the application of current to the switch and the solenoid.

2. In combination, a pump comprising a cylinder, a piston, a check valve, an abutment, a solenoid, a solenoid core connected to said piston and yieldingly connected to the abutment to resist the movement of the piston and the solenoid core, a solenoid circuit associated with said core, switch means for making and breaking the circuit, and a lever to operate the switch, operable by the position of the solenoid core to apply current to the solenoid circuit to move the core into the solenoid and thereupon cut off the current to the solenoid coil while the yielding means returns the core and the pump piston to its initial position.

3. In combination in a pump of a cylinder, a piston, a check valve, inlet and delivery lines to said cylinder, a solenoid comprising a coil and core, said core being rigidly connected by rods to said piston, yielding means between the rods for resisting the movement of said core into said solenoid, a snap switch interposed in a circuit supplying said solenoid core with current, and lever means connecting said switch to said core adapted to close and open said switch at the extremes of movement of said core with respect to the coil.

4. In combination in a pump of a cylinder, a piston, a check valve, inlet and delivery lines to said cylinder, a solenoid comprising a coil and core, said core being rigidly connected by rods to said piston, yielding means between the rods for resisting the movement of said core into said solenoid, a snap switch interposed in a circuit supplying said solenoid core with current, means connecting said switch to said core adapted to close and open said switch at the extremes of movement of said core with respect to the coil, a pressure operated master switch connected into the delivery line of said pump whereby, upon the accomplishment of a predetermined pressure, current supplied to said solenoid and switch is cut off and upon the decrease of such pressure to a predetermined point, current is restored.

5. In combination, a pump, a solenoid adapted to operate said pump in one direction, means to cushion the end of the stroke of the solenoid in that direction, a switch adapted to cut off current to the solenoid at the end of its inner stroke, snap means connected to the solenoid to operate the switch, yielding means adapted to resist the movement of said solenoid to its inner position and to return said solenoid and piston to the pump to its initial position.

6. In combination, a pump comprising a cylinder having inlet and outlet lines, a check valve in each line, a piston in said pump, a solenoid having its core connected to said piston, a switch controlling the application of current to the solenoid comprising a toggle snap switch, an arm adapted to operate said toggle pivotally connected to the core of said solenoid, and yielding means for resisting the movement of the solenoid core into the solenoid coil.

7. In combination, a pump comprising a cylinder having inlet and outlet lines, a check valve in each line, a piston in said pump, a solenoid having its core connected to said piston, a switch controlling the application of current to the solenoid comprising a toggle snap switch, an arm adapted to operate said toggle pivotally connected to the core of said solenoid, yielding means for resisting the movement of the solenoid core into the solenoid coil, and means to cushion said inward movement.

8. In combination, a pump comprising a cylinder having inlet and outlet lines, a check valve in each line, a piston in said pump, a solenoid having its core connected to said piston, a switch controlling the application of current to the solenoid comprising a toggle snap switch, an arm adapted to operate said toggle pivotally connected to the core of said solenoid, yielding means for resisting the movement of the solenoid core into the solenoid coil, a pipe on the outlet side of said pump, an expansible metal bellows mounted thereon, a main line switch connected thereto, means to yieldingly resist the movement of said bellows to adjust the pressure at which the switch will be actuated whereby the current is supplied to the solenoid coil only when the pressure in the outgoing side of the pump decreases below a predetermined point.

9. In combination, a pump having a piston and rod, a solenoid having a core rigidly connected to the rod, an abutment serving to guide the core, a spring acting against the abutment to urge the piston and core in one direction, and means operated by the movement of the core to open and close a circuit through the solenoid.

10. In combination, a pump having a piston and rod, a solenoid having a core rigidly connected to the rod, a fixed abutment, said core having a plunger in engagement with the abutment to guide the core, a spring between the abutment and the rod to urge the piston and the core in one direction, and means operated by the movement of the core to open and close a circuit through the solenoid.

MICHAEL A. S. LAVIGNE.